(12) United States Patent
Nagata et al.

(10) Patent No.: US 8,134,966 B2
(45) Date of Patent: Mar. 13, 2012

(54) TRANSMISSION DEVICE

(75) Inventors: Satoshi Nagata, Yokosuka (JP);
Yoshiaki Ofuji, Yokohama (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 228 days.

(21) Appl. No.: 12/377,932

(22) PCT Filed: Aug. 13, 2007

(86) PCT No.: PCT/JP2007/065819
§ 371 (c)(1),
(2), (4) Date: May 5, 2009

(87) PCT Pub. No.: WO2008/023594
PCT Pub. Date: Feb. 28, 2008

(65) Prior Publication Data
US 2010/0157913 A1 Jun. 24, 2010

(30) Foreign Application Priority Data
Aug. 22, 2006 (JP) .................................. 2006-225915

(51) Int. Cl.
*H04W 4/10* (2009.01)
*H04J 11/00* (2006.01)
*H04B 7/216* (2006.01)

(52) U.S. Cl. ........................ 370/329; 370/208; 370/342

(58) Field of Classification Search .................... 370/329
See application file for complete search history.

(56) References Cited

U.S. PATENT DOCUMENTS

| | | | |
|---|---|---|---|
| 2003/0099280 A1 | 5/2003 | Kumar et al. | |
| 2005/0031044 A1 | 2/2005 | Gesbert et al. | |
| 2005/0220002 A1* | 10/2005 | Li et al. | 370/208 |
| 2007/0064669 A1* | 3/2007 | Classon et al. | 370/347 |
| 2007/0217540 A1* | 9/2007 | Onggosanusi et al. | 375/267 |
| 2007/0293229 A1* | 12/2007 | Khan | 455/450 |
| 2009/0028260 A1* | 1/2009 | Xiao et al. | 375/260 |

(Continued)

FOREIGN PATENT DOCUMENTS
EP     1 976 317 A1     10/2008
(Continued)

OTHER PUBLICATIONS

Office Action in Taiwanese Patent Application No. 096130469 Mailed Oct. 14, 2010, with English translation thereof (5 pages).

(Continued)

*Primary Examiner* — Kenny Lin
*Assistant Examiner* — Shaq Taha
(74) *Attorney, Agent, or Firm* — Osha • Liang LLP

(57) ABSTRACT

A transmission device is disclosed that includes a frequency scheduling unit configured to allocate resource blocks as a unit to each user, the resource blocks being blocks of consecutive frequency subcarriers divided from a system bandwidth, constitute a first group including consecutive plural resource blocks, constitute plural second groups, each including one or more resource blocks of the plural resource blocks constituting each first group, and allocate the resource blocks of either the first group or one or more the second groups; a mapping unit configured to allocate transmission data to the resource blocks in accordance with the allocation; and a control information generating unit configured to generate control information with respect to a mobile station to which either the first group or one or more the second groups are allocated.

30 Claims, 15 Drawing Sheets

U.S. PATENT DOCUMENTS

2009/0196272 A1* 8/2009 Tsutsui .................. 370/342

FOREIGN PATENT DOCUMENTS

| EP | 1 981 302 A1 | 10/2008 |
|---|---|---|
| TW | 200629944 | 8/2006 |
| WO | 2006/025773 | 3/2006 |
| WO | 2007/083569 A1 | 7/2007 |
| WO | 2007/083728 A1 | 7/2007 |

OTHER PUBLICATIONS

Abstract of the Disclosure in Taiwanese Application No. 200629944 dated Aug. 16, 2006 (1 page).

Philips, "Resource-Block Mapping of Distributed Transmissions in E-UTRA Downlink," 3GPP TSG RAN WG1 Meeting #47bis, Tdoc R1-070344, Jan. 19, 2007, pp. 1-4 (4 pages).

N. Miki, et al., "OFDM o Mochiiru Evolved UTRA Kudari Link ni Okeru L1/L2 Seigyo Channel no Kosei Oyobi Channel Fugokaho" ("Structure and Channel Coding Schemes for Layer 1/Layer 2 Control Channel in OFDM Based Evolved UTRA Downlink"), IEICE Technical Report, vol, 106, No. 223, The Institute of Electronics, Information and Communication Engineers, Aug. 24, 2006, pp. 49 to 54 (7 pages).

S. Nagata, et al., "OFDMA o Mochiiru Evolved UTRA ni Okeru Kyoyu Data Channel ni Taisuru Block Bunkatsu o Mochiiru Resource Block Level no Distributed Soshinho" ("Block-Wise Resource Block-Level Distributed Transmission for Shared Data Channel in OFDMA-Based Evolved UTRA Downlink"), IEICE Technical Report, vol. 106, No. 168, The Institute of Electronics, Information and Communication Engineers, Jul. 12, 2006, pp. 251-256 (7 pages).

NTT DoCoMo, et al., "Distributed FDMA Transmission for Shared Data Channel in E-UTRA Downlink," 3GPP TSG-RAN WG1 Meeting #44, R1-060305, Feb. 17, 2006, pp. 1-15 (15 pages).

3GPP R2-062036 draft, "Evolved Universal Terrestrial Radio Access (E-UTRA) and Evolved Universal Terrestrial Radio Access Network (E-UTRAN); Overall description; Stage 2," Section 16, "RF aspects," Jul. 2006 (4 pages).

International Search Report in PCT/JP2007/065819, mailed on Nov. 13, 2007, with translation (5 pages).

Written Opinion issued in PCT/JP2007/065819 mailed on Nov. 13, 2007 (3 pages).

* cited by examiner

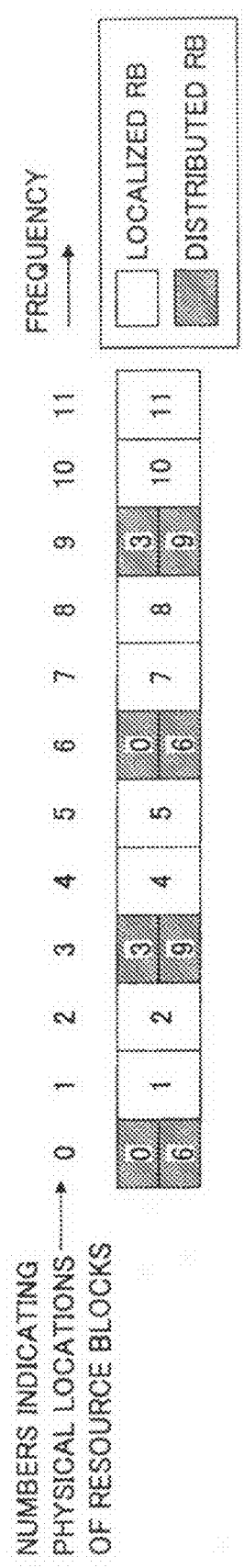

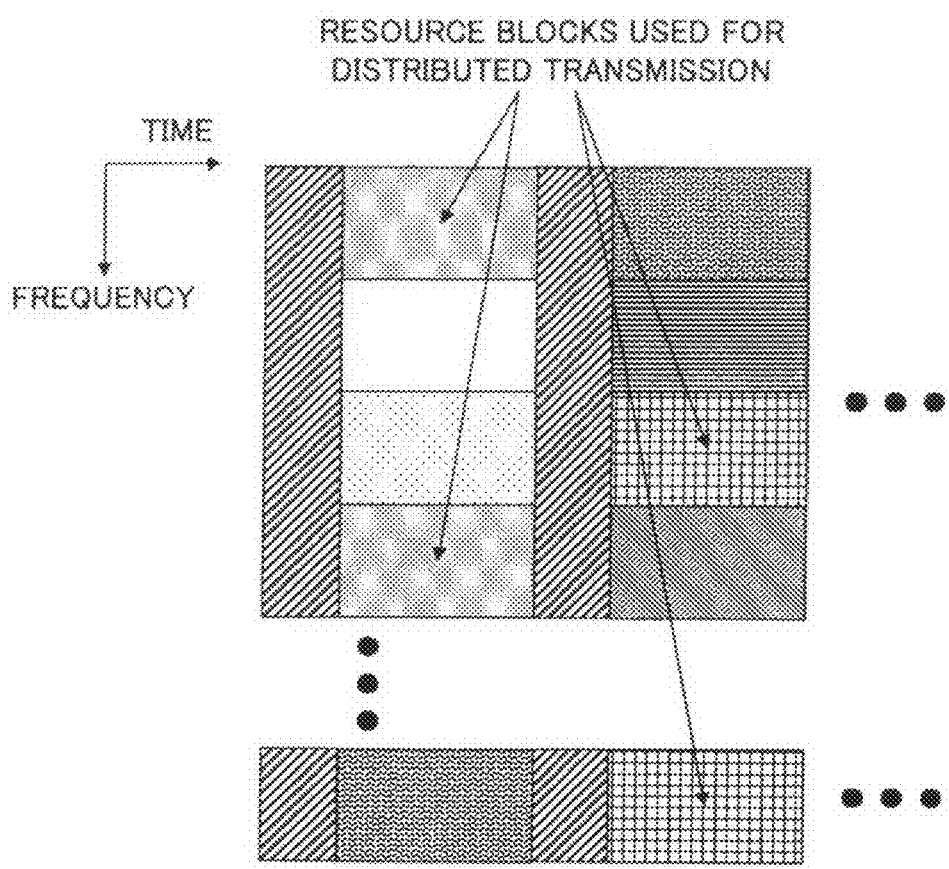

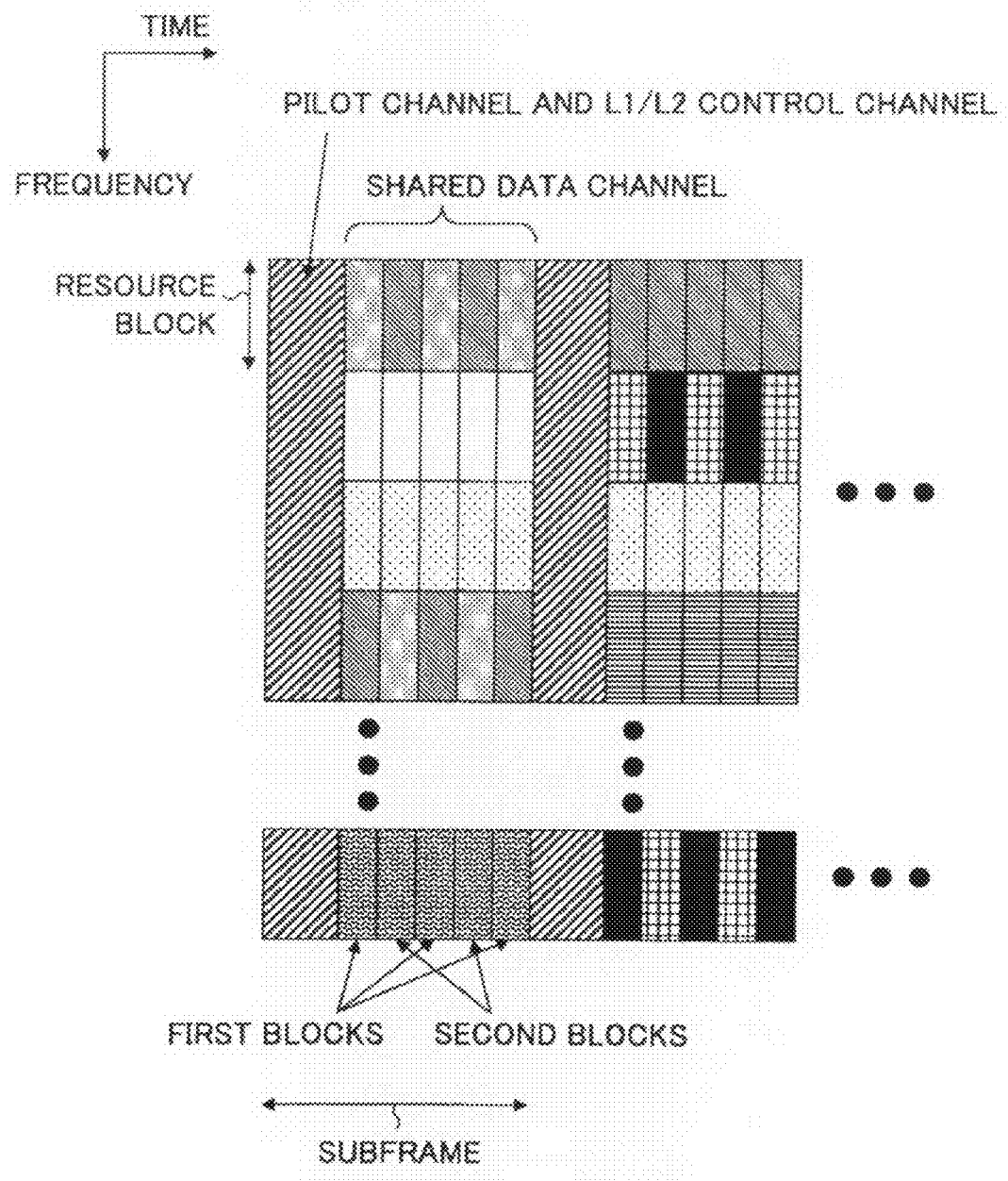

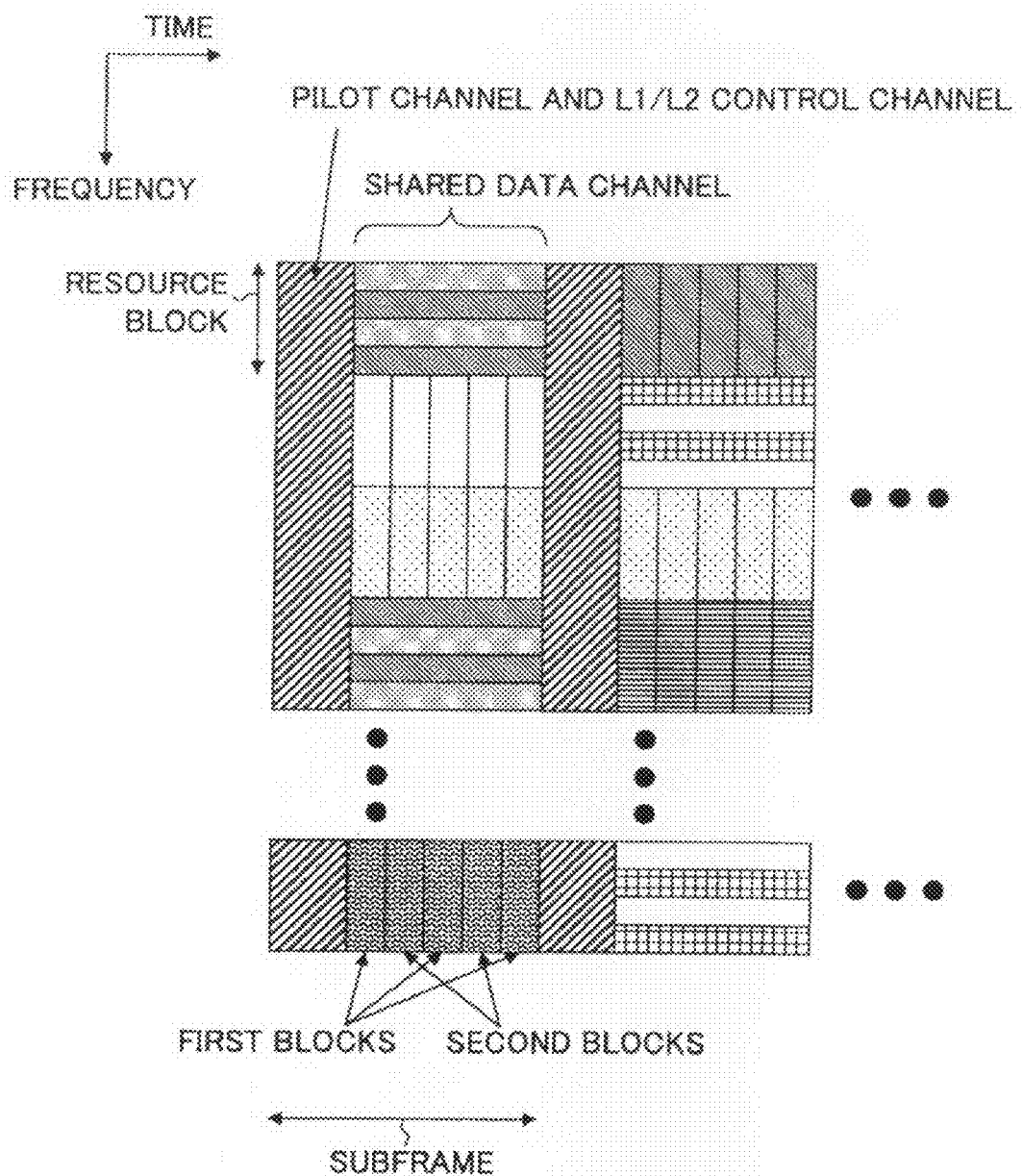

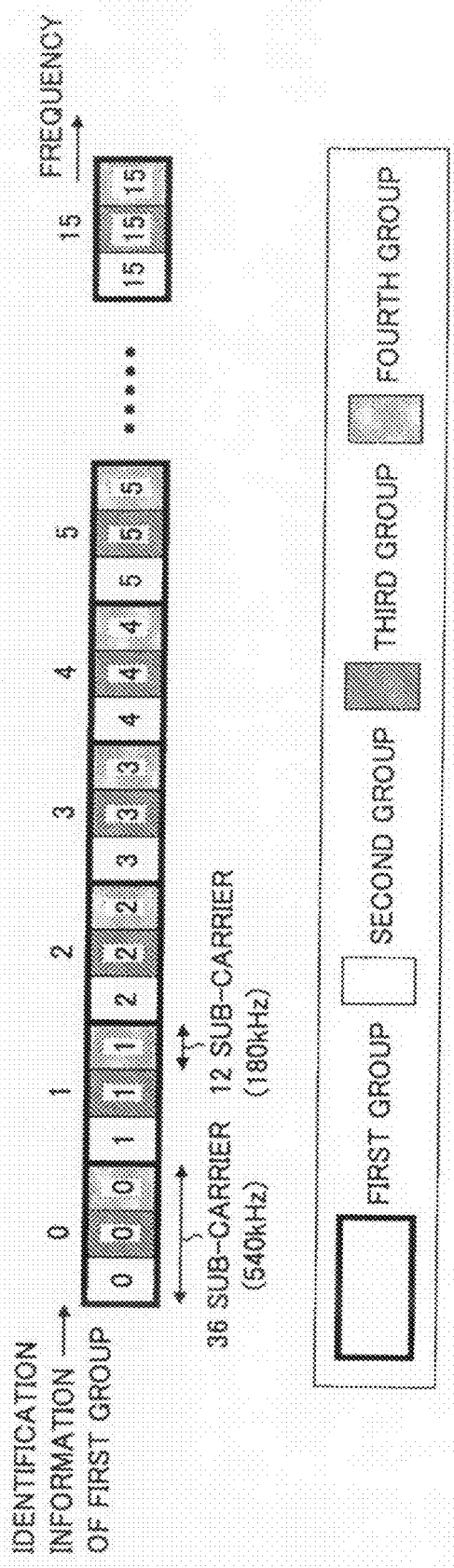

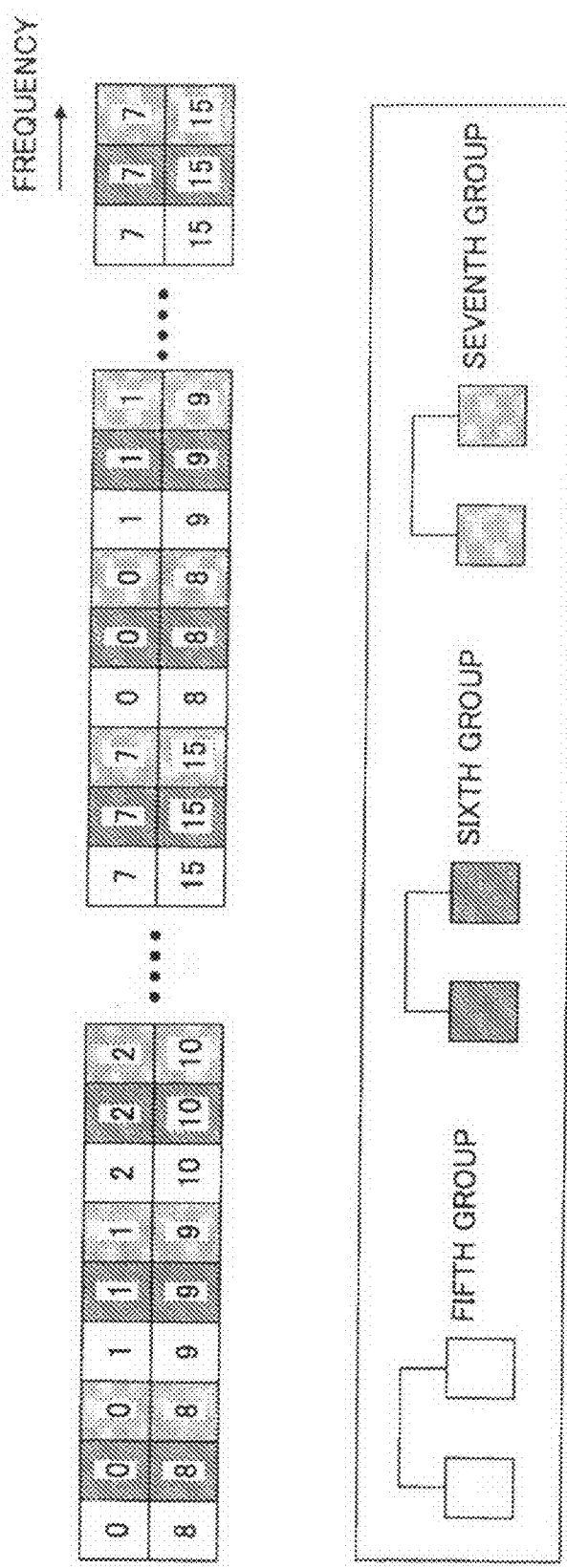

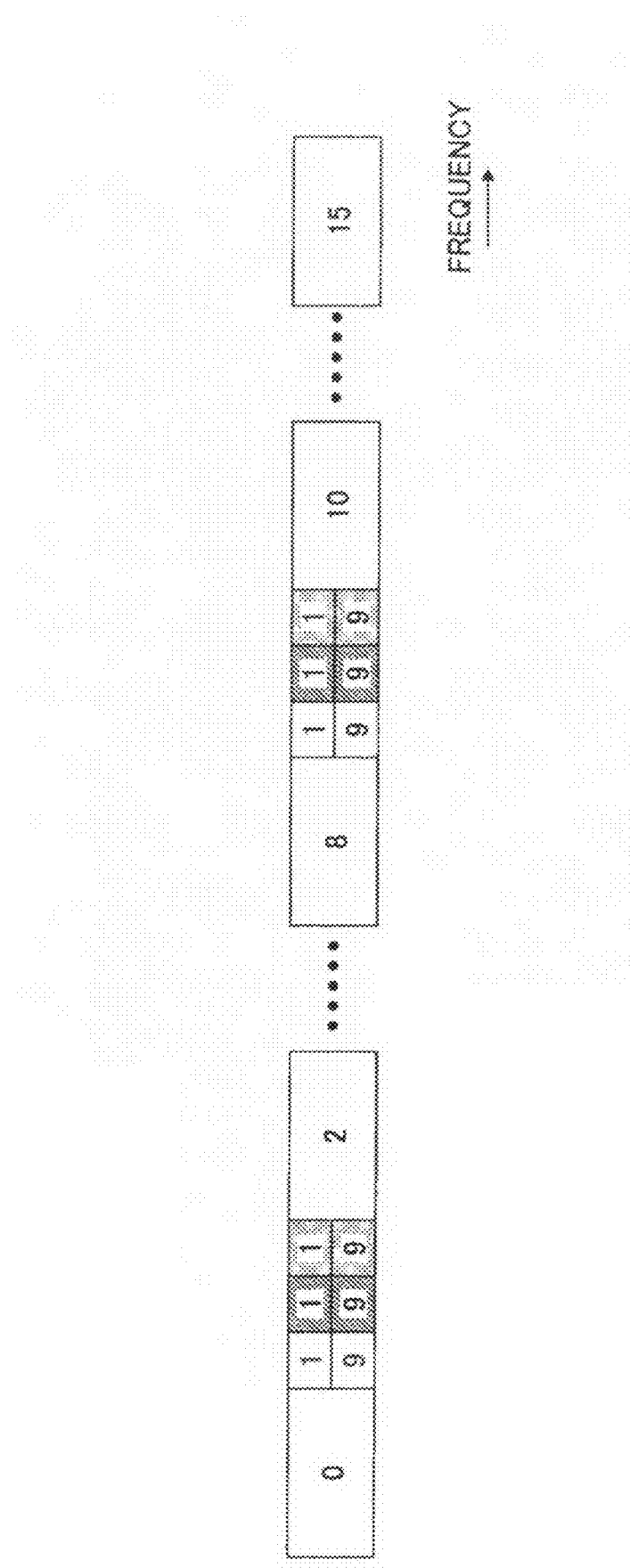

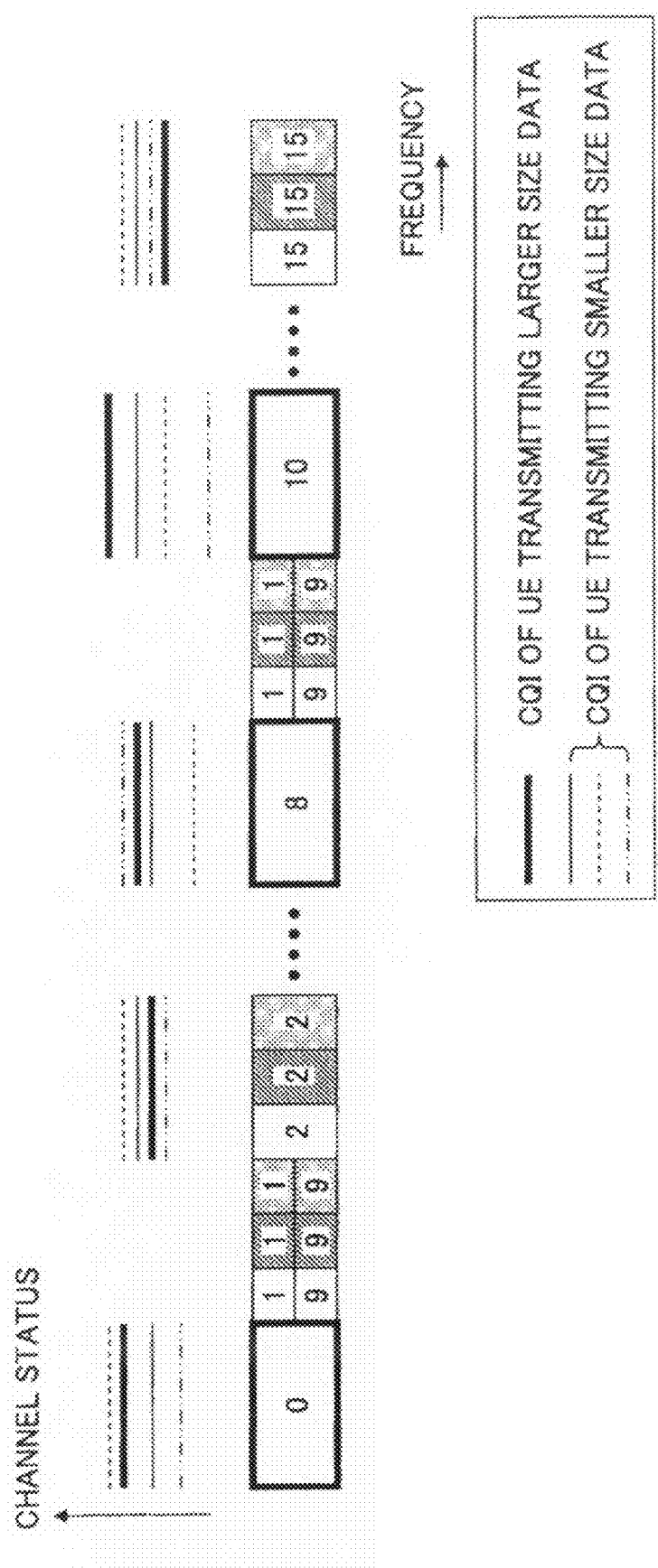

FIG.10B

| ID (UE-ID) OF ALLOCATED UE | ALLOCATION INFORMATION OF RESOURCE BLOCKS IN PRESCRIBED GROUP | GROUP INFORMATION OF RESOURCE BLOCKS | ALLOCATION INFORMATION IN GROUPS ASSIGNED BY GROUP INFORMATION OF RESOURCE BLOCKS |

TRANSMISSION TYPE

FIG.12

| ALLOCATION INFORMATION IN RESOURCE BLOCKS OF FIRST GROUP | | | ALLOCATED RESOURCE BLOCKS |
|---|---|---|---|
| 0 | 0 | 0 | 1 |
| 0 | 0 | 1 | 2 |
| 0 | 1 | 0 | 3 |
| 0 | 1 | 1 | 1, 2 |
| 1 | 0 | 0 | 2, 3 |
| 1 | 0 | 1 | 3, 1 |
| 1 | 1 | 0 | 1, 2, 3 |

IDENTIFICATION INFORMATION OF FIRST GROUP

```
0            1            2       ...   15
[1][2][3] [1][2][3] [1][2][3]    ...  [1][2][3]
```

TRANSMISSION DEVICE

TECHNICAL FIELD

The present invention generally relates to an LTE (Long Term Evolution) system, and more particularly to a transmission device.

BACKGROUND ART

As a communication system succeeding the W-CDMA and the HSDPA, an LTE (Long Term Evolution) system is being worked on by the 3GPP ($3^{rd}$ Generation Partnership Project), which is the standardization group for the W-CDMA. In the LTE system, an OFDMA (Orthogonal Frequency Division Multiple Access) system is being considered for the downlink, and an SC-FDMA (Single-Carrier Frequency Division Multiple Access) system is being considered for the uplink.

In the OFDMA system, a frequency bandwidth is divided into plural narrower frequency bandwidths (subcarriers), and data are transmitted by being carried on the frequency bandwidths. By contiguously arranging the subcarriers without interfering with each other though the subcarriers may be partially overlapped, it becomes possible to achieve fast transmission and improve the use efficiency of the frequency bandwidths.

The SC-FDMA system is a transmission system in which a frequency bandwidth is divided so that plural terminals can transmit using a different frequency bandwidth among the plural terminals to reduce the interference between the terminals. The SC-FDMA system has the characteristics that the variation of the transmitting power becomes small. Therefore, the configuration of the transmitter of the terminal can be relatively simplified.

In addition, as the transmission methods in a downlink data channel, there are localized transmission and distributed transmission.

In localized transmission, as shown in FIG. 1A, a frequency block is allocated as a unit to each user. For example, in localized transmission, the frequency blocks having good frequency selective fading are allocated. Generally, localized transmission may be effectively used when the size of the transmission data is large and the frequency scheduling effect is required to be enhanced. The frequency block may be called a resource block.

In distributed transmission, as shown in FIG. 1B, data are spread (distributed) across the entire available bandwidth without relation to the frequency blocks and transmitted. For example, distributed transmission is generally used when the frequency scheduling may not be performed due to fast movement and when the size of the transmission data is small such as the case of VoIP.

In the LTE system, it is required for a single system to support various sizes of packets ranging from packets having a larger size used in browsing a Web site or the like to packets having a smaller size used in VoIP or the like in communications with slow users and fast moving users as well.

To support both the localized transmission and distributed transmission by a single system, there has been proposed a communication device in which, when distributed transmission is performed at the resource block level, one resource block is divided into plural divided blocks, and the divided blocks are allocated as the resource blocks.

This communication device generates control information with respect to a mobile station to which the resource blocks are allocated. For example, the allocated bandwidth is divided into plural parts and identification codes such as identification numbers indicating the physical locations of the thus-divided and generated plural resource blocks are assigned to the plural resource blocks.

In this case, a division number of the resource blocks to be used for distributed transmission among the plural resource blocks is set equal to an allocation unit of the divided resource blocks to be allocated to a mobile station as a unit and is defined as "$N_D$" (where $N_D$ is an integer number greater than 0). Namely, the divided resource blocks are assigned by regarding the resource block as a unit. FIG. 2A shows a case where $N_D$=2. According to FIG. 2A, in a case of $N_D$=2, each of the resource blocks used for distributed transmission is divided into two parts (divided resource blocks), and the two divided resource blocks, namely a pair of the divided resource blocks, becomes a unit to be allocated to a mobile station. In this case, the physical locations of the resource blocks used for distributed transmission are predetermined in accordance with the total number of resource blocks used for distributed transmission.

In this case, as shown in FIG. 2B, a specific signaling format for transmitting the allocation information includes each field for an ID (UE-ID) of an allocated mobile station, a transmission type indicating which of localized transmission or distributed transmission is to be performed, and allocation information with respect to each resource block, namely, the resource block used for localized transmission and the resource block for distributed transmission. In the fields for the allocation information with respect to the resource blocks, subfields corresponding to the resource blocks are provided, and information of allocated or non-allocated is assigned to the subfields. An assigning method of the allocation information with respect to the resource blocks is called "bitmap". A base station transmits control bits including such allocation information as many numbers as the number of mobile stations allocated to perform localized transmission and distributed transmission.

Non Patent Document 1: R2-062036, "Evolved Universal Radio Access (E-UTRA) and Evolved Universal Terrestrial Radio Access Network (E-UTRAN); Overall description; Stage 2," Section 16 RF aspects

DISCLOSURE OF INVENTION

Problems to be Solved by the Invention

However, the prior art described above has the following problem.

The resource blocks are provided by dividing a system bandwidth, i.e., an allocated bandwidth, into plural parts. The consideration of the size of the resource block is being conducted.

When the size of the resource block is 25 subcarriers (375 kHz), there are many transmission data exist that don't require one resource block. Therefore, there has been a proposal in which the size of the resource block is reduced to 12 subcarriers (180 kHz).

By adopting this proposal, the size of the resource block becomes smaller and accordingly, the number of resource blocks included in the allocated system bandwidth can be increased, and the degree of freedom of allocating the resource blocks to a user may be increased. However, since the number of resource blocks is increased, the number of signaling bits is increased. More specifically, there is an increase in the number of bits necessary for the allocation information with respect to each resource block described with reference to FIG. 2B.

The number of bits necessary for the signaling announcing the allocation of the resource blocks to a user is proportional to the number of the resource blocks. Because of this feature, the number of signaling bits increases in proportion to the increased number of the resource blocks.

For example, when the system bandwidth is 10 MHz, the number of resource blocks is approximately 50. In this case, when a method is applied in which the allocation information is assigned with respect to each resource block using separate coding and bitmap, sixty (60) or more bits per mobile station become necessary.

In a transmission device according to an embodiment of the present invention, both of localized transmission and distributed transmission are supported in a single system, and even when the number of resource blocks is increased, the increase of the signaling bits announcing the allocation of the resource blocks to a user can be minimized.

Means for Solving the Problems

According to an aspect of the present invention, a transmission device includes a frequency scheduling unit configured to allocate resource blocks as a unit to each user, the resource blocks being blocks of consecutive frequency subcarriers divided from a system bandwidth, constitute a first group including consecutive plural resource blocks, constitute plural second groups, each including one or more resource blocks of the plural resource blocks constituting each first group, and allocate the resource blocks of either the first group or one or more the second groups;

a mapping unit configured to allocate transmission data to the resource blocks in accordance with the allocation; and a control information generating unit configured to generate control information with respect to a mobile station to which either the first group or one or more the second groups are allocated.

According to another aspect of the present invention, a transmission device generates distributed-type resource blocks including discretely-distributed frequency subcarriers in the system bandwidth by using the plural resource blocks of the second groups, and the distributed-type resource blocks are allocated as a unit.

By having these configurations, it becomes possible to group resource blocks and generate signaling information (control information) by regarding the group as a unit.

ADVANTAGEOUS EFFECT OF THE INVENTION

According to an embodiment of the present invention, it becomes possible to provide a transmission device in which both of localized transmission and distributed transmission are supported as a single system, and even when the number of resource blocks is increased, the increase of the signaling bits announcing the allocation of the resource blocks to a user can be minimized.

BRIEF DESCRIPTION OF THE DRAWINGS

FIG. 2A is a drawing showing an example of frequency scheduling;
FIG. 4 is a drawing showing frequency scheduling in a transmission device according to an embodiment of the present invention;
FIG. 5A is a drawing showing frequency scheduling in a transmission device according to an embodiment of the present invention;
FIG. 5B is a drawing showing frequency scheduling in a transmission device according to an embodiment of the present invention;
FIG. 6 is a drawing showing a configuration of the resource blocks to be used for localized transmission;
FIG. 7 is a drawing showing a configuration of the resource blocks to be used for distributed transmission;
FIG. 8 is a drawing showing a configuration of resource blocks to be used for localized transmission and the resource blocks to be used for distributed transmission;
FIG. 9 is a drawing showing an example where the resource blocks to be used for localized transmission are allocated to a mobile station;
FIG. 10B is a drawing showing an example of signaling format in a transmission device according to an embodiment of the present invention;
FIG. 12 is drawing showing an example of correspondence between the allocation information with respect to the resource blocks of a first group and the resource blocks to be allocated.

EXPLANATION OF REFERENCES

100 TRANSMISSION DEVICE

BEST MODE FOR CARRYING OUT THE INVENTION

Figure 1A:
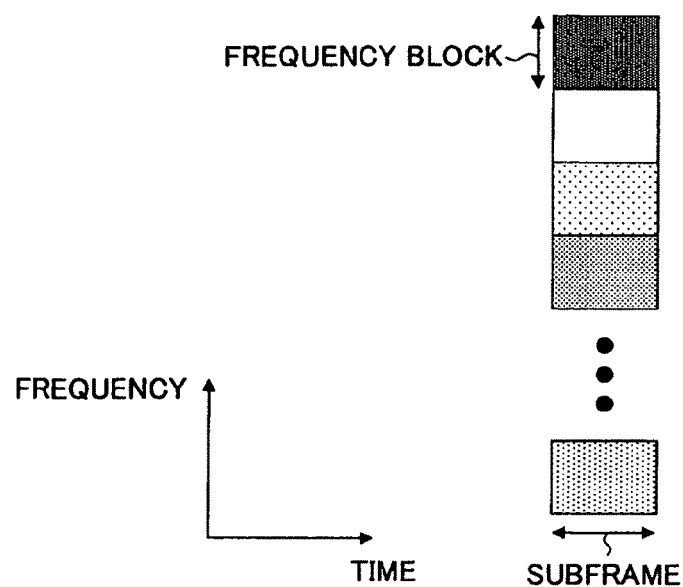
FIG. 1A is a drawing showing a localized transmission.
Figure 1B:
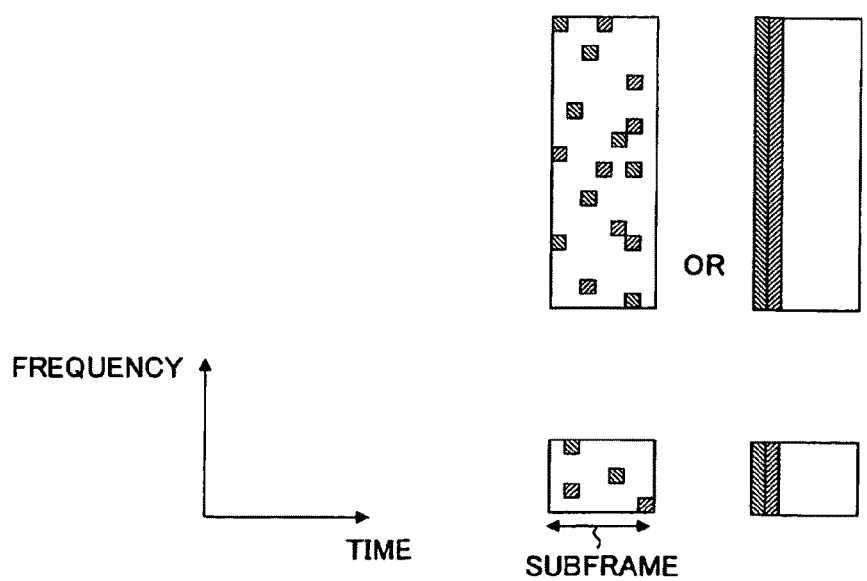
FIG. 1B is a drawing showing a distributed transmission.
Figure 2B:
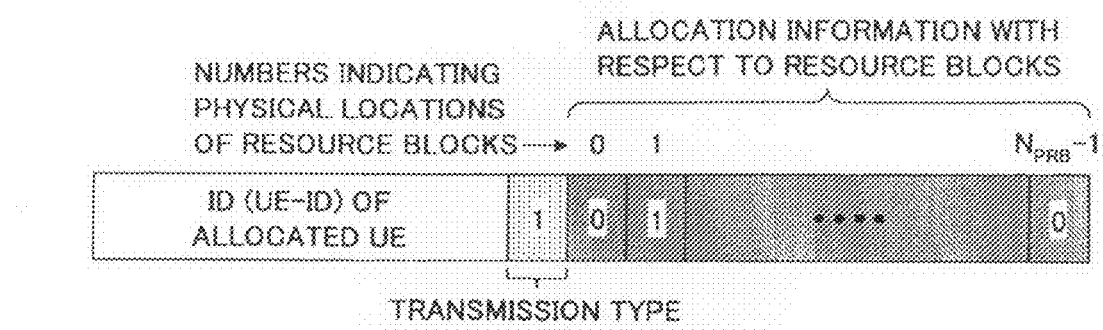
FIG. 2B is a drawing showing an example of a signaling format.

Next, the best mode for carrying out the invention is described based on the following embodiments with reference to the accompanying drawings.

In all the figures, the same reference numerals are commonly used for the elements having the same function, and repeated descriptions of such elements are omitted.

Figure 3:
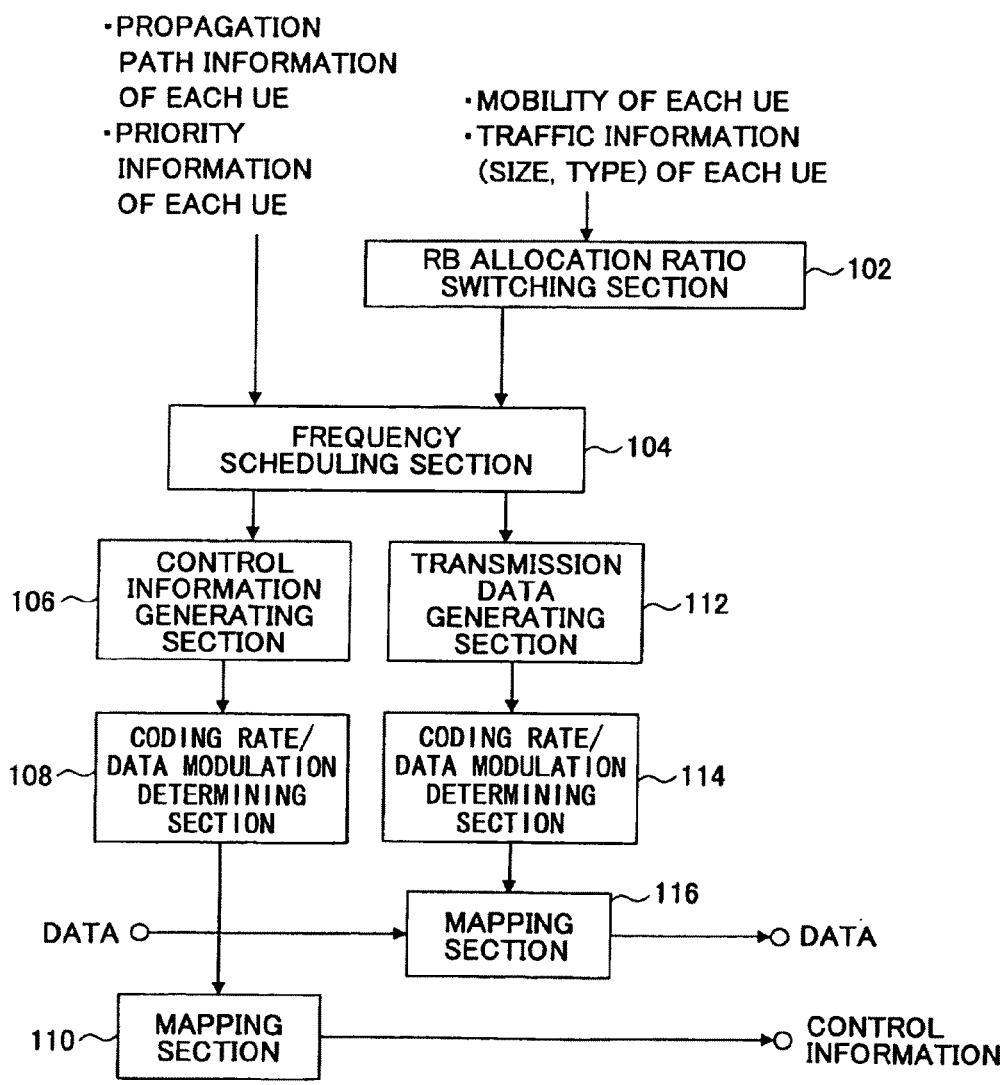
FIG. 3 is a partial block diagram showing a transmission device according to an embodiment of the present invention.

A transmission device according to an embodiment is described with reference to FIG. 3.

A transmission device 100 according to the embodiment of the present invention performs distributed transmission at the localized transmission level. The transmission device 100 may be incorporated in, for example, a base station. Namely, a resource block used for the localized transmission is divided into plural parts and the thus-divided resource blocks (divided resource blocks) are allocated to a user who uses distributed transmission.

As shown in FIG. 4, the transmission device 100 includes a resource block (RB) allocation ratio switching section 102, a frequency scheduling section 104, a control information generating section 106, a transmission data generating section 112, coding rate/data modulation determining sections 108 and 114, and mapping sections 110 and 116. The resource block (RB) allocation ratio switching section 102 inputs information indicating the mobility of each mobile station (UE) and information indicating traffic of the mobile stations such as size and type of transmission data. The frequency scheduling section 104 inputs propagation path information of each mobile station such as the status of the downlink propagation path, the priority information of the mobile station, and the output signal from the resource block allocation ratio switching section 102. The output signal from the frequency scheduling section 104 is input to the control information generating section 106 and the transmission data generating section 112. The output signal from the control information generating section 106 is input to the coding rate/data modulation determining section 108, and the output signal from the transmission data generating section 112 is input to the coding rate/data modulation determining section 114. The mapping section 110 inputs the output signal from the coding rate/data modulation determining section 108 and outputs control information. The mapping section 116 inputs the output signal from the coding rate/data modulation determining section 114 and data and outputs data.

The resource block allocation ratio switching section 102 determines mobile stations to perform localized transmission and mobile stations to perform the distributed transmission based on the information indicating the mobility of each mobile station (UE), the information indicating traffic, and the like. The resource block allocation ratio switching section 102 further determines a ratio between the resource blocks to be allocated to the mobile stations that perform localized transmission and the resource blocks to be allocated to the mobile stations that perform distributed transmission, and inputs the determined value of the ratio to the frequency scheduling section 104 as resource block allocation ratio information.

The resource block allocation ratio switching section 102 determines that, for example, a mobile station having high mobility and a mobile station transmitting traffic having small data size such as VoIP are the mobile stations which are to perform distributed transmission. Further, upon determining the allocation ratio of the resource blocks, the resource block allocation ratio switching section 102 increases the rate of resource blocks allocated to perform distributed transmission when, for example, there are many mobile stations having high mobility or there are many mobile stations that transmit traffic data having a small data size such as in VoIP.

The frequency scheduling section 104 allocates resource blocks to each mobile station based on the input information indicating the propagation path of the mobile stations, priority information indicating priority of the mobile stations, and the resource block allocation ratio information. Herein, the priority information refers to digitized information with respect to each mobile station by considering the items such as whether a retransmission request is included, an elapsed time after packets are transmitted from a transmission terminal, a target transmission rate, actual throughput, and an allowable delay in the packet transmission.

For example, the frequency scheduling section 104 adaptively switches the allocation ratio between the resource blocks which are to perform localized transmission and the resource blocks which are to perform distributed transmission at every predetermined cycle such as at every cycle of scheduling based on the status of each mobile station such as a channel status and the resource block allocation ratio information determined in accordance with the traffic. By doing this, the throughput of a data channel may be increased.

Further, the frequency scheduling section 104 may switch the allocation ratio between the resource blocks which are to perform localized transmission and the resource blocks which are to perform distributed transmission at a longer period based on the status of each mobile station such as the resource block allocation ratio information determined in accordance with the traffic. By doing this, the control may be performed more easily compared with the case where the switching is performed at every cycle of scheduling.

For example, as shown in FIG. 4, the frequency scheduling section 104 allocates the data to be transmitted in localized transmission and the data to be transmitted in distributed transmission by using the resource block as an allocation unit. Namely, the frequency scheduling section 104 allocates distributed-type resource blocks having discretely-distributed frequency subcarriers in a system bandwidth to each user by using the resource blocks that are blocks of consecutive frequency subcarriers divided from the system bandwidth as an allocation unit. By doing this, it becomes possible to eliminate the use of signaling information that is necessary when distributed transmission is to be performed.

Further, when distributed transmission is to be performed at the resource block level, the frequency scheduling section 104 divides one resource block into plural parts, for example, "N" divided parts (where N is an integer number greater than 0). Namely, the frequency scheduling section 104 allocates the distributed-type resource blocks as the resource block with respect to a user who uses distributed transmission. Herein, the resource block may also be regarded as a unit for mapping users or, for example, a unit for allocating a certain user.

For example, as shown in FIG. 5A, the frequency scheduling section 104 divides one resource block into plural parts such as two parts in the time direction and allocates the resource block with respect to users who use distributed transmission to the mobile stations that perform distributed transmission such as two users. As shown in FIG. 5A, the frequency scheduling section 104 allocates first blocks and second blocks to different users.

Further, for example, as shown in FIG. 5B, the frequency scheduling section 104 may divide one resource block into plural parts such as two parts in the frequency direction and allocate the resource blocks with respect to users who use distributed transmission to the mobile stations that perform distributed transmission such as two users. For example, as shown in FIG. 5B, the frequency scheduling section 104 allocates first blocks and second blocks to different users.

In FIGS. 5A and 5B, the first two symbols represent pilot and signaling bits, i.e., a pilot channel and an L1/L2 control channel.

In distributed transmission at the resource block level, a frequency diversity effect cannot be obtained unless plural resource blocks, namely plural distributed-type resource blocks, with respect to a user who uses distributed transmission are allocated. Because of this feature, in such a case of traffic data whose size is small such as VoIP, all data may be included into one resource block and the frequency diversity effect cannot be obtained. In a case of VoIP, the data size of one packet is, for example, 180 bits.

As described above, by dividing a resource block into N parts, it becomes possible to allocate the packet data that can otherwise be included in a single resource block to N distributed-type resource blocks, thereby increasing the frequency diversity effect.

The control information generating section 106 generates control information with respect to the mobile stations to which the resource blocks are allocated by the frequency scheduling section 104.

The coding rate/data modulation determining section 108 determines a coding rate and a data modulation value that are used when the control information is transmitted.

The mapping section 110 performs the data modulation and coding that are determined by the coding rate/data modulation determining section 108 and performs mapping on a physical channel. As a result, the control information is transmitted.

The transmission data generating section 112 generates transmission data in accordance with the number of resource blocks allocated to each mobile station. For example, the transmission data generating section 112 determines the amount of transmission data.

The coding rate/data modulation determining section 114 determines a coding rate and a data modulation value with respect to the data of each mobile station allocated by the frequency scheduling section 104 and the control information.

The mapping section 116 performs the data modulation, coding, and mapping on a physical channel.

Next, a specific example of the operations of the above-mentioned frequency scheduling section 104 is described in detail.

As described above, when the system bandwidth is divided into plural parts, each of the divided bandwidths is called a resource block. In this embodiment of the present invention, the number of resource blocks obtained by dividing an allocated bandwidth is defined as "$N_{PRB}$" (where $N_{PRB}$ is an integer number greater than 1). The identification codes such as identification numbers are allocated to the resource blocks to identify the resource blocks. In this embodiment of the present invention, for example, a case is described where the allocated bandwidth is divided into 48 parts ($N_{PRB}$=48) and in the 48 resource blocks, consecutive three (3) resource blocks are grouped (first group) and the same identification number is allocated to those grouped resource blocks. However, this embodiment of the present invention may be applied to cases where the division number is lower than 48 and greater than 48. Further, the above number of resource blocks belonging to the first group is merely an example, and the embodiment of the present invention may be applied to cases where the number is less than 3 and the number is greater than 3.

For example, as shown in FIG. 6, when one resource block includes 12 subcarriers (180 kHz), the first group has 36 subcarriers (540 kHz).

Further, there are provided other groups as plural second groups each including one or more resource blocks from each first group. For example, from among three consecutive resource blocks in each first group, resource blocks located at the same location in the first groups are grouped, so that second, third, and fourth groups are provided.

The resource blocks are allocated to users who use localized transmission by regarding each of the first, the second, the third, and the fourth groups as a unit.

In this case, a base station having a transmitter performs downlink frequency scheduling. A mobile station announces the channel status used for the frequency scheduling to the base station. Then, the channel status is announced by using the first group as a unit. The total bandwidth of the resource blocks constituting the first group is substantially equal to the bandwidth used as a measurement unit for receiving channel status. Namely, the mobile station averages the channel status of the resource channels included in the first group (three resource blocks in this embodiment) and announces the averaged result as the channel status of the first group. By doing this, the frequency scheduling may be applied to the allocation of resource blocks of the second through the fourth groups as well while neither measuring at a higher resolution than is necessary nor performing feedback is necessary. Namely, it is not necessary to measure data of the receiving channel in each group nor to perform feedback.

To a user who transmits data having small data size, the allocation is performed by using the second through the fourth groups as a unit. When the allocation is performed by using the second though the fourth groups as a unit, the channel status announced from the mobile station has the same value; therefore, the allocation is performed based on another condition. On the other hand, for a user who transmits data having large data size, the allocation is performed by using the first group as a unit.

To a user who uses distributed transmission, in accordance with the division number of the resource blocks, the distributed-type resource blocks are allocated using the resource blocks as a unit. Namely, by using the above-mentioned plural resource blocks of the other groups as the second groups, the distributed-type resource blocks including discretely-distributed frequency subcarriers in the system bandwidth are generated. In this case, from among three consecutive resource blocks in the first group, the same number of the distributed-type resource blocks as the division number located at the same locations in the first group are called fifth through seventh groups. For example, when the division number is 2, as shown in FIG. 7, two (2) distributed-type resource blocks are in each of the fifth through the seventh groups.

Next, the allocation of the resource blocks to a mobile station that performs the above-mentioned localized transmission and the allocation of the resource blocks to a mobile station that performs distributed transmission are described.

The RB allocation ratio switching section 102 determines a necessary number of resource blocks to be used for distributed transmission based on the rate of the mobile stations that perform distributed transmission and traffic amount. Here, the rate of the mobile stations that perform distributed transmission refers to, for example, a ratio of the data size of the mobile station that performs localized transmission to the data size of the mobile station that performs distributed transmission. FIG. 8 shows a case where six (6) resource blocks that are to perform distributed transmission are generated. Namely, the number of distributed-type resource blocks that are to perform distributed transmission is six (6) because the allocation is performed by using the resource block as a unit.

Next, the frequency scheduling section 104 allocates resource blocks used for localized transmission to the mobile station. In this case, the resource blocks other than the resource blocks that have been determined to be the resource blocks used for distributed transmission are allocated.

As described above, the mobile station announces the channel status by using the first group as a unit. The frequency scheduling section 104 allocates the resource blocks to each mobile station that performs localized transmission as described below.

FIG. 9 shows an example where the resource blocks are allocated to the mobile stations that perform localized transmission.

The frequency scheduling section 104 allocates the resource blocks to the mobile stations that perform localized transmission based on the channel status such as Channel Quality Indicator (CQI) announced from each mobile station.

The frequency scheduling section 104 classifies the mobile stations that perform localized transmission into the mobile stations that transmit larger size data and the mobile stations that transmit smaller size data. For example, the frequency scheduling section 104 sets a threshold value of the data size and classifies the mobile stations based on the threshold value.

Next, by using the channel status announced from the mobile stations, the average of the channel status announced from the mobile stations that transmit smaller size data is obtained with respect to each first group. Here, the number of mobile stations is predetermined, the number being used for obtaining the average of the channel status. For example, the number is the same as the number of resource blocks grouped as the first group.

Next, in the first group, when the channel status of the mobile station that transmits larger size data is greater than the average of the channel status of the mobile stations that transmit smaller size data, the first group is allocated to the mobile station that transmits larger size data. Here, the mobile station that transmits larger size data refers to the mobile station having the best channel status among the mobile stations that request the transmission of larger size data. On the other hand, the mobile stations that transmit smaller size data refer to the above-mentioned predetermined number of mobile stations that request the transmission of smaller size data.

Further, when the channel status of the mobile station that transmits larger size data is less than the average of the channel status of the mobile stations that transmit smaller size data, the first group is divided into plural resource blocks and the divided resource blocks are allocated to the mobile stations that transmit smaller size data. For example, when the number of the mobile stations used for obtaining the average of channel status is the same as the number of resource blocks to be grouped as the first group, each of the resource blocks is allocated to one of the mobile stations. In this embodiment of the present invention, if the number of the mobile stations to be averaged is three (3), those mobile stations can be allocated to three (3) resource blocks constituting the first group. For example, the resource block having 540 kHz bandwidth is divided into three (3) resource blocks having 180 kHz bandwidth and the divided resource blocks are allocated to the mobile stations that transmit smaller size data.

Next, the control information generated by control information generating section 106 is described with reference to FIG. 10A.

Figure 10A:
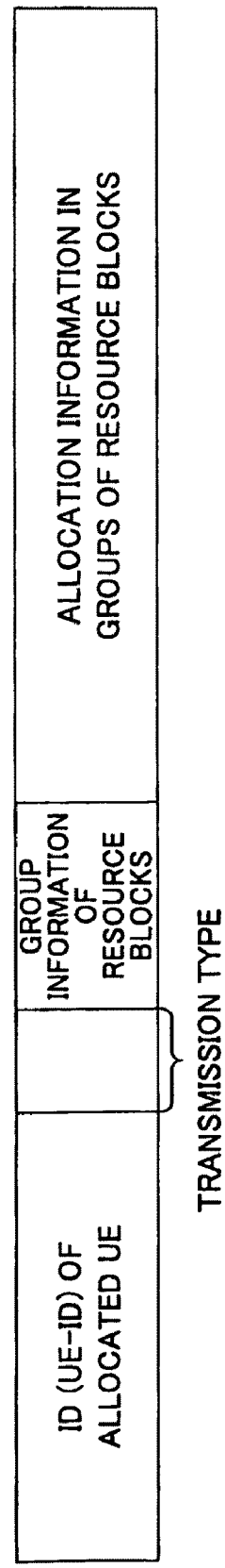
FIG. 10A is a drawing showing an example of signaling format in a transmission device according to an embodiment of the present invention.

As shown in FIG. 10A, the control information with respect to the mobile stations includes each field for an ID (UE-ID) of an allocated mobile station, a transmission type indicating which of localized transmission or distributed transmission is to be performed, and allocation information with respect to the groups of resource blocks. For the allocation information with respect to the groups of the resource blocks, sixteen (16) sub-fields corresponding to the number of the first, the second, the third, and the fourth groups are provided in this example.

For example, in a case where zero (0) indicating localized transmission is assigned as the transmission type and the information indicating the first, the second, the third, or the fourth group is assigned as the group information of the resource blocks, each sub-field of the allocation information in a group of resource blocks indicates the corresponding first, second, third, or fourth group, and the information indicating whether allocated or non-allocated in each of the first, the second, the third, or the fourth group is assigned; for example, one (1) is assigned when allocated and zero (0) is assigned when not allocated.

Further, for example, in a case where one (1) indicating distributed transmission is assigned as the transmission type and the information indicating the fifth, sixth, or seventh group is assigned as the group information of the resource blocks, each sub-field of the allocation information in groups of the resource blocks indicates the location where the fifth, sixth, and seventh group, respectively, is allocated, and the information indicating whether allocated or non-allocated in the fifth, the sixth, or the seventh group is assigned; for example, one (1) is assigned when allocated and zero (0) is assigned when not allocated.

Next, the control information generated by the control information generating section 106 is described with reference to FIG. 10B. Here, the control information is described when plural groups are allocated.

As shown in FIG. 10B, the control information with respect to the mobile stations includes each field for an ID (UE-ID) of an allocated mobile station, a transmission type indicating which of localized transmission or distributed transmission is to be performed, the allocation information of the resource blocks in a prescribed group, the information indicating the group of the resource blocks, and the allocation information in the group assigned in the information indicating the group of the resource blocks. For the allocation information of the resource blocks in the prescribed group and the allocation information in the group assigned in the information indicating the group of the resource blocks, sixteen (16) sub-fields corresponding to the number of the first, the second, the third, and the fourth groups are provided.

For example, in a case where zero (0) indicating localized transmission is assigned as the transmission type and the information indicating the first, the second, the third, or the fourth group is assigned as the group information of the resource blocks, each sub-field of the allocation information in the group assigned in the information indicating the group of the resource blocks indicates the first, the second, the third, or the fourth group, and the information indicating whether allocated or non-allocated in the first, the second, the third, or the fourth group is assigned; for example, one (1) is assigned when allocated and zero (0) is assigned when not allocated. Further, to each sub-field of the allocation information of the resource blocks in a prescribed group, the information indicating whether allocated or non-allocated in a group other than the group assigned by, for example, the group information of resource blocks is assigned; for example, one (1) is assigned when allocated and zero (0) is assigned when not allocated.

Further, for example, in a case where one (1) indicating distributed transmission is assigned as the transmission type and the information indicating the second, the third, or the fourth group is assigned as the group information of the resource blocks, each sub-field of the allocation information in groups of the resource blocks indicates the allocated location of the fifth, the sixth, and the seventh group that are the groups of the distributed-type resource blocks generated from the second, the third, and the fourth groups, respectively, and the information indicating whether allocated or non-allocated in the fifth, the sixth, and the seventh groups is assigned; for example, one (1) is assigned when allocated and zero (0) is assigned when not allocated. Further, to each sub-field of the allocation information of the resource blocks in a prescribed group, the information indicating whether allocated or non-allocated in a group which is, for example, other than the group assigned by the group information of resource blocks is assigned; for example, one (1) is assigned when allocated and zero (0) is assigned when not allocated.

Next, other control information generated by the control information generating section 106 is described with reference to FIGS. 11 and 12.

Figure 11:
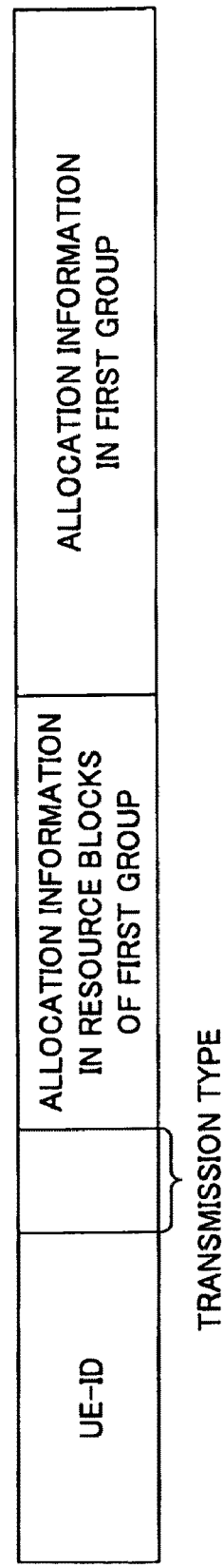
FIG. 11 is a drawing showing an example of signaling format in a transmission device according to an embodiment of the present invention.

As shown in FIG. 11, the control information with respect to the mobile stations includes each field for an ID (UE-ID) of an allocated mobile station, a transmission type indicating which of localized transmission or distributed transmission is to be performed, the allocation information in the resource blocks of the first group, and the allocation information in the first group.

As shown in FIG. 12, to the allocation information in the resource blocks of the first group, the allocation information of the resource blocks constituting the first group is assigned. For example, in response to the allocation information in the resource blocks of the first group, the combination of the resource blocks to be allocated is predetermined.

To the allocation information in the first group, the information indicating whether allocated or non-allocated is assigned by using the first group as a unit; for example, one (1) is assigned when allocated and zero (0) is assigned when not allocated.

According to an embodiment of the present invention, the consecutive plural resource blocks constitute the first group; the resource blocks located at the same location of the plural resource blocks in the first group constitute the second groups; and either the first group or one or more of the second groups can be allocated. Further, by assigning the identification numbers indicating the groups of the resource blocks, the allocation with respect to each group may be assigned. Therefore, even when the number of the resource blocks is increased, it becomes possible to minimize the increase of the signaling bits announcing the allocation of the resource blocks to a user.

In the above description, the present invention is described by being divided into several embodiments. However, it should be noted that the division of the present invention into several embodiments is not an essential element of the present invention. For example, two or more embodiment may be combined on as as-needed basis. To promote an understanding of the present invention, specific values are used as examples throughout the description. However, it should be noted that such specific values are just sample values unless otherwise described, and any other values may be used.

The present invention is described by referring to a specific embodiment. However, a person skilled in the art may understand that the above embodiment is described for illustrative purposes only and may think of examples of various modifications, transformations, alterations, changes, and the like. For illustrative purposes, the apparatus according to an embodiment of the present invention is described with reference to the functional block diagrams. However, such an apparatus may be provided by hardware, software, or a combination thereof. The present invention is not limited to the embodiment described above, and various modifications, transformations, alteration, exchanges, and the like may be made without departing from the scope and spirit from the present invention.

The present application is based on and claims the benefit of priority of Japanese Patent Application No. 2006-225915, filed on Aug. 22, 2006, the entire contents of which are hereby incorporated herein by reference.

INDUSTRIAL APPLICABILITY

The transmission device according to an embodiment of the present invention may be used in a wireless communications system.

The invention claimed is:

1. A transmission device, comprising:
a frequency scheduling unit adapted for a system where
i) a system bandwidth is divided into a plurality of resource blocks each comprising a plurality of consecutive frequency subcarriers;
ii) first groups, fewer than the resource blocks, are defined to respectively be a group of a plurality of consecutive resource blocks; and
iii) second groups are defined so that each of the second group is included in each of the first groups and includes at least one resource block included in each of the first groups, the frequency scheduling unit being operative to assign a downlink channel to at least one first group or at least one resource block in the second groups; and
a mapping unit operative to map data in the downlink channel into the at least one first group assigned by the frequency scheduling unit or the at least one resource block assigned by the frequency scheduling unit.

2. The transmission device according to claim 1, wherein the numbers of resource blocks in respective first groups are the same, and
the frequency scheduling unit defines a plurality of second groups each formed by grouping the resource blocks that are included in the first groups and that are numbered with the same number counting from low frequency side in the respective first groups.

3. The transmission device according to claim 1, wherein the frequency scheduling unit generates distributed-type resource blocks of frequency subcarriers discretely distributed in the system bandwidth, using a plurality of resource blocks in the second groups.

4. The transmission device according to claim 1, wherein a total bandwidth of the resource blocks constituting the first group used in the frequency scheduling unit is substantially equal to a bandwidth used as a measurement unit of a receiving channel status.

5. The transmission device according to claim 1, wherein the frequency scheduling unit assigns either the at least one first group or the at least one resource block in the second group, based on a channel status measured in each first group from each mobile station.

6. The transmission device according to claim 2, wherein the frequency scheduling unit assigns either the at least one first group or the at least one resource block in the second group, based on a channel status measured in each first group from each mobile station.

7. The transmission device according to claim 3, wherein the frequency scheduling unit assigns either the at least one first group or the at least one resource block in the second group, based on a channel status measured in each first group from each mobile station.

8. The transmission device according to claim 4, wherein the frequency scheduling unit assigns either the at least one first group or the at least one resource block in the second group, based on a channel status measured in each first group from each mobile station.

9. The transmission device according to claim 5, wherein the frequency scheduling unit assigns the at least one first group or the at least one resource block in the second group to each mobile station, based on a size of data to be transmitted by each mobile station.

10. The transmission device according to claim 6, wherein the frequency scheduling unit assigns the at least one first group or the at least one resource block in the second group to each mobile station, based on a size of data to be transmitted by each mobile station.

11. The transmission device according to claim 7, wherein the frequency scheduling unit assigns the at least one first group or the at least one resource block in the second group to each mobile station, based on a size of data to be transmitted by each mobile station.

12. The transmission device according to claim 8, wherein the frequency scheduling unit assigns the at least one first group or the at least one resource block in the second group to each mobile station, based on a size of data to be transmitted by each mobile station.

13. The transmission device according to claim 9, wherein the frequency scheduling unit compares, in each of the first groups, the channel status of the mobile station having the best channel status among the mobile stations having the data size to be transmitted equal to or greater than a predetermined threshold value with an average of the channel status of the mobile stations, the number of which are predetermined, among the mobile stations having the data size to be transmitted less than the predetermined threshold value, and assigns, when the channel status of the mobile station having the best channel status is better, the first group to the mobile station having the best channel status.

14. The transmission device according to claim 10, wherein
the frequency scheduling unit compares, in each of the first groups, the channel status of the mobile station having the best channel status among the mobile stations having the data size to be transmitted equal to or greater than a predetermined threshold value with an average of the channel status of the mobile stations, the number of which are predetermined, among the mobile stations having the data size to be transmitted less than the predetermined threshold value, and assigns, when the channel status of the mobile station having the best channel status is better, the first group to the mobile station having the best channel status.

15. The transmission device according to claim 11, wherein
the frequency scheduling unit compares, in each of the first groups, the channel status of the mobile station having the best channel status among the mobile stations having the data size to be transmitted equal to or greater than a predetermined threshold value with an average of the channel status of the mobile stations, the number of which are predetermined, among the mobile stations having the data size to be transmitted less than the predetermined threshold value, and assigns, when the channel status of the mobile station having the best channel status is better, the first group to the mobile station having the best channel status.

16. The transmission device according to claim 12, wherein
the frequency scheduling unit compares, in each of the first groups, the channel status of the mobile station having the best channel status among the mobile stations having the data size to be transmitted equal to or greater than a predetermined threshold value with an average of the channel status of the mobile stations, the number of which are predetermined, among the mobile stations having the data size to be transmitted less than the predetermined threshold value, and assigns, when the channel status of the mobile station having the best channel status is better, the first group to the mobile station having the best channel status.

17. The transmission device according to claim 13, wherein
the frequency scheduling unit compares, in each of the first groups, the channel status of the mobile station having the best channel status among the mobile stations having the data size to be transmitted equal to or greater than the predetermined threshold value with an average of the channel status of the mobile stations, the number of which are predetermined, among the mobile stations having the data size to be transmitted less than the predetermined threshold value, and assigns, when the channel status of the mobile station having the best channel status is worse, the resource blocks constituting the first group to the mobile stations, the number of which are predetermined.

18. The transmission device according to claim 14, wherein
the frequency scheduling unit compares, in each of the first groups, the channel status of the mobile station having the best channel status among the mobile stations having the data size to be transmitted equal to or greater than the predetermined threshold value with an average of the channel status of the mobile stations, the number of which are predetermined, among the mobile stations having the data size to be transmitted less than the predetermined threshold value, and assigns, when the channel status of the mobile station having the best channel status is worse, the resource blocks constituting the first group to the mobile stations, the number of which are predetermined.

19. The transmission device according to claim 15, wherein
the frequency scheduling unit compares, in each of the first groups, the channel status of the mobile station having the best channel status among the mobile stations having the data size to be transmitted equal to or greater than the predetermined threshold value with an average of the channel status of the mobile stations, the number of which are predetermined, among the mobile stations having the data size to be transmitted less than the predetermined threshold value, and assigns, when the channel status of the mobile station having the best channel status is worse, the resource blocks constituting the first group to the mobile stations, the number of which are predetermined.

20. The transmission device according to claim 16, wherein
the frequency scheduling unit compares, in each of the first groups, the channel status of the mobile station having the best channel status among the mobile stations having the data size to be transmitted equal to or greater than the predetermined threshold value with an average of the channel status of the mobile stations, the number of which are predetermined, among the mobile stations having the data size to be transmitted less than the predetermined threshold value, and assigns, when the channel status of the mobile station having the best channel status is worse, the resource blocks constituting the first group to the mobile stations, the number of which are predetermined.

21. The transmission device according to claim 1, further comprising a control information generating unit operative to generate, when the frequency scheduling unit assigns the at least one first group, control information for identifying the first group to be assigned among the first groups fewer than the resource blocks, or to generate, when the frequency scheduling unit assigns the at least one resource block in the second group, control information for identifying the resource block in the second group to be assigned.

22. A transmission method adapted for a system where
i) a system bandwidth is divided into a plurality of resource blocks each comprising a plurality of consecutive frequency subcarriers;

ii) first groups, fewer than the resource blocks, are defined to respectively be a group of a plurality of consecutive resource blocks; and iii) second groups are defined so that each of the second group is included in each of the first groups and includes at least one resource block included in each of the first groups, the method comprising:

assigning a downlink channel to at least one first group or at least one resource block in the second groups; and mapping data in the downlink channel into the at least one first group subject to the assignment or the at least one resource block subject to the assignment.

23. The transmission method according to claim 22, wherein the numbers of resource blocks in respective first groups are the same, and in the assigning, a plurality of second groups each formed by grouping the resource blocks that are included in the first groups and that are numbered with the same number counting from low frequency side in the respective first groups are defined.

24. The transmission method according to claim 22, wherein in the assigning, distributed-type resource blocks of frequency subcarriers discretely distributed in the system bandwidth are generated, using a plurality of resource blocks in the second groups.

25. The transmission method according to claim 22, wherein in the assigning, a total bandwidth of the resource blocks constituting the first group is substantially equal to a bandwidth used as a measurement unit of a receiving channel status.

26. The transmission method according to claim 22, wherein in the assigning, either the at least one first group or the at least one resource block in the second group is assigned, based on a channel status measured in each first group from each mobile station.

27. The transmission method according to claim 26, wherein in the assigning, the at least one first group or the at least one resource block in the second group is assigned to each mobile station, based on a size of data to be transmitted by each mobile station.

28. The transmission method according to claim 27, wherein in the assigning, in each of the first groups, the channel status of the mobile station having the best channel status among the mobile stations having the data size to be transmitted equal to or greater than a predetermined threshold value is compared with an average of the channel status of the mobile stations, the number of which are predetermined, among the mobile stations having the data size to be transmitted less than the predetermined threshold value, and, when the channel status of the mobile station having the best channel status is better, the first group is assigned to the mobile station having the best channel status.

29. The transmission method according to claim 28, wherein in the assigning, in each of the first groups, the channel status of the mobile station having the best channel status among the mobile stations having the data size to be transmitted equal to or greater than the predetermined threshold value is compared with an average of the channel status of the mobile stations, the number of which are predetermined, among the mobile stations having the data size to be transmitted less than the predetermined threshold value, and, when the channel status of the mobile station having the best channel status is worse, a resource block constituting the first group is assigned to the mobile stations, the number of which are predetermined.

30. The transmission method according to claim 22, further comprising generating, when the at least one first group is assigned, control information for identifying the first group to be assigned among the first groups fewer than the resource blocks, or, generating, when the at least one resource block in the second group is assigned, control information for identifying the resource block in the second group to be assigned.

* * * * *